Jan. 13, 1925.
J. F. O'CONNOR
1,522,535
ANTIFRICTION BEARING
Filed April 6, 1921
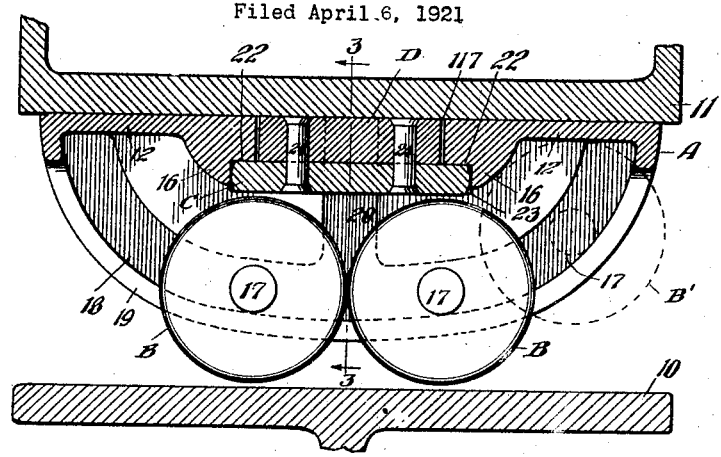
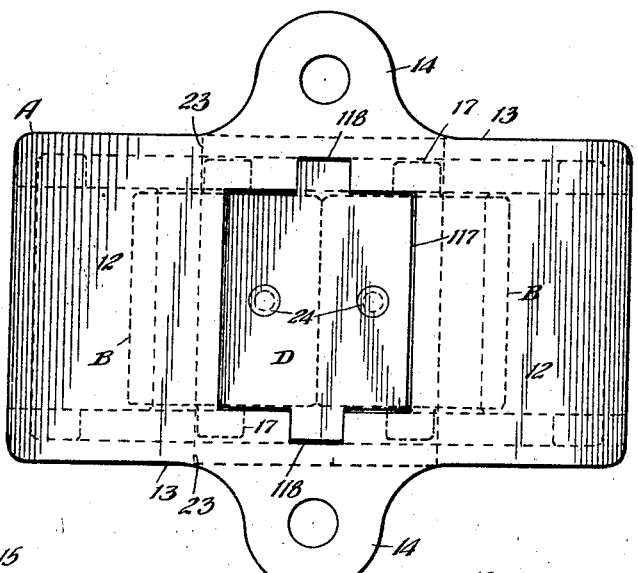
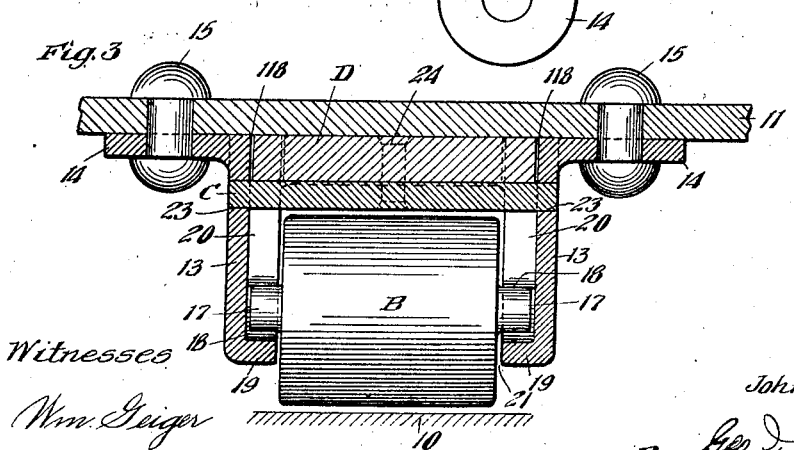
Witnesses
Wm. Geiger
Inventor
John F. O'Connor
By Geo. J. Haight
Atty Patented Jan. 13, 1925.

1,522,535

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION BEARING.

Application filed April 6, 1921. Serial No. 459,070.

*To all whom it may concern:*

Be it known that I, JOHN F. O'CONNOR, a citizen of the United States, residing at Chicago, in the county of Cook and State of Illinois, have invented a certain new and useful Improvement in Antifriction Bearings, of which the following is a full, clear, concise, and exact description, reference being had to the accompanying drawings, forming a part of this specification.

This invention relates to improvements in antifriction bearings.

As is well known, it is highly essential that manufacturers and sellers of railway supplies so make their product that it may be shipped to the various car builders in an assembled condition so as to avoid any possibility of loss of parts accidentally or by theft in transit and minimize possibility of the product being improperly applied to the cars. This is particularly true of side bearings which necessarily include elements that are relatively movable.

One object of my invention is to provide an anti-friction bearing which is especially designed for use as a body bolster side bearing on railway cars, the construction being such that it may be readily assembled at the place of manufacture and shipped without danger of loss of any parts or derangement thereof to thereby insure the side bearing reaching its destination in proper condition and avoiding possibility of the parts being improperly applied to the car.

Another object of the invention is to provide an anti-friction bearing of the character indicated which is composed of few parts each of which may be manufactured at a comparatively small cost and wherein the load is taken on the anti-friction elements proper in such way as to place the anti-friction elements proper solely under compression and free from bending, torsional or eccentric loads.

Another object of the invention is to provide a body bolster side bearing for railway cars so designed that the anti-friction element or elements return to normal position after removal of the actuating force, without the use of springs or other relatively delicate means likely to get out of order.

In the drawing forming a part of this specification, Figure 1 is a vertical sectional view taken through the end portions of a truck bolster and body bolster of a railway car and showing my improvements in connection therewith. Figure 2 is a top plan view of the anti-friction bearing proper, detached, shown in Figure 1. And Figure 3 is a vertical, sectional view taken transversely of the side bearing and lengthwise of the bolsters, corresponding substantially to the line 3—3 of Figure 1.

In said drawing, 10 denotes the upper portion of a truck bolster which may be of any desired form having an upper bearing surface arranged to cooperate with the side bearing. 11 indicates the lower or under side of an opposed body bolster and to which my improved side bearing is adapted to be attached on the under side thereof in a depending position. As understood by those skilled in the art, the two bolsters will be pivotally connected at their centers by the king pin or other equivalent structure and the two bolsters adapted to move relatively in circular paths.

The improved bearing, as shown, comprises, broadly, a housing or retaining member designated generally by the reference A; a pair of anti-friction elements B—B; a bearing plate C; and a filler block D.

The housing or retaining member A, as shown, is formed with a top wall 12 extending from end to end of the retaining member; depending parallel spaced side walls 13—13; and laterally extended lugs 14—14, said lugs being perforated and adapted to receive rivets or other suitable fastening devices 15 therethrough for the purpose of securing the member A in position. The top wall 12 is thickened at the center thereof on the under side as indicated at 16 and is also provided with an opening at its center which opening is of rectangular form in its main part as indicated at 117 with lateral relatively narrow extensions 118—118 on each side, as best shown in Figure 2. The opening 117—118 is of such size and form as to just permit the insertion and removal of the anti-friction elements B, hereinafter described.

In the illustration shown, I employ two anti-friction elements B, each of like construction and in the form of a true solid cylinder of the desired diameter and length, preferably 3″ in diameter and 3½″ to 4″ in length. At each end, each roller B is provided with a laterally extended lug or stud 17 in alinement with the axis of the roller and by which the rollers are adapted to be supported when the bearing is not in operation. Said studs 17 work in guide grooves 18—18 formed on the inner sides of the side walls 13, the width of said guide grooves 18 being slightly greater than the diameter of the studs 17 so as to admit of slight lifting of the rollers B with respect to the side walls. The guide grooves 18, as formed, obviously provide lower inturned oppositely disposed curved flanges 19 which act as supports for the studs of the rollers when the latter are not under load. Each of said guide grooves 18 is upwardly curved at its ends, said upwardly curved end portions corresponding to relatively short radii and united at the bottom of the housing A by another arcuate section struck on a comparatively long radius. At the center of the member A, a vertically extending groove or passage 20 is formed in alinement with the portions 118 of the opening in the top of the member A and opening at their lower ends into said guide grooves 18 so that the rollers B, after insertion through the opening in the top of the member A are permitted to drop down into position, as will be understood. The spacing of the side walls of the member A and the length of the rollers B, are made such that there is a slight clearance between the ends of the rollers and said side walls as indicated at 21, this arrangement permitting free rolling of the rollers B but at the same time preventing any appreciable twisting or displacement of the rollers with respect to the side walls of the member A.

The thickened portion 16 of the top wall of the member A is undercut on opposite sides of the opening 117 so as to provide downwardly facing shoulders 22—22 against which the wear plate C bears and is prevented from movement in an upward direction. Said plate C is of rectangular form and is inserted within the retaining member A through horizontally alined slots 23—23 in the side walls 13, as best shown in Figure 3.

The block D is made of such form and size as to substantially occupy the opening 117—118 in the top wall and of such thickness that, when in place, the top surface thereof will lie flush with the top surface of the wall 12. The block D and plate C, after the parts are assembled, are rigidly united by any suitable means, as for instance by the flush rivets 24—24. In this connection, it will be observed that the two rollers B may be moved to their endmost positions, thereby leaving ample space between the two rollers for the end of a riveting tool on the interior of the retaining member A.

In commercial practice, the retaining member A will preferably be made of malleable iron; the rollers of white iron; the plate C of tempered steel; and the block D of malleable iron. From this it will be seen that the cost of manufacture of each part is kept at a very small figure and each part is of substantial, rugged construction. In assembling, the rollers B are first introduced successively through the opening in the top wall of the retaining member A, the plate C then inserted, the block D next inserted, and finally the block D and plate C rigidly united. When so assembled, it is evident that none of the parts can be removed or displaced without destructive effect on at least some part of the device, thus effectively preventing any loss or misplacement of parts or tampering with the device. In actual practice, the upper bearing peripheral surfaces of the rollers B will be slightly spaced from the plate C when the bearing is not in action so that the weight of the rollers will be sustained by the studs 17.

In operation, when the two bolsters 10 and 11 approach each other, the load will be taken by the two rollers B, the latter being under compression only. In this connection it will be noted that there is a solid mass of metal between the upper bearing surfaces of the rollers B and the bolster 11 so that neither the plate C nor the block D sustains any load other than compression. As the two bolsters 10 and 11 shift in circular paths relatively to each other, one of the rollers, as for instance the righthand roller B, will move off from the upper bearing surface therefor and be gradually forced to the elevated position shown by the dotted lines B' in Figure 1, the load being sustained by the lefthand roller B. Upon separation of the bolsters 10 and 11 sufficiently to remove the load from the rollers B, both will be supported by their studs 17 on the flanges 19 and, due to the fact that one of them has been elevated as for instance to the position B', it will automatically seek to return to its lowermost normal position, thus not only returning itself but also forcing the other roller B back to its normal position. In this manner the anti-friction elements are rendered self-centering without the aid of springs or other weak devices, and there is always insured at least one of the rollers being in proper position to receive the load and with sufficient freedom for full travel. It will further be observed that, even though the bearing is subject to jarring or vibration when the rollers are not under load, nevertheless it is practically impossible for both rollers to be simultaneously jarred to a position where neither of them is in a condition to receive the load since, if the effect of the jar or vibration is to shift one roller in one direction, the other roller must necessarily be subject to I have herein shown and described what I now consider the preferred manner of carrying out the invention, but the same is merely illustrative and I contemplate all changes and modifications that come within the scope of the claims appended hereto.

I claim:

1. In an anti-friction bearing adapted for attachment to the under side of a body bolster or the like, the combination with a retaining member having depending side walls and a top wall extending from end to end, said top wall having an opening therethrough, of an upper bearing plate closing said opening; means secured to said plate for preventing lateral movement of said plate in its own plane, said bearing plate being confined against movement in all other directions by direct engagement with said retaining member; an anti-friction element mounted between and guided by said side walls, said element being insertable and removable only through said opening, said element being arranged to roll back and forth within said member and with its periphery engaging with said bearing plate, said element in part depending below said side walls and adapted to engage with an opposed bearing surface; and co-operating means on said side walls and element by which the element is supported and automatically returned to normal position under the influence of gravity, said means including, extensions from the ends of said element and guideways therefor in said side walls, said guideways being higher at their ends than at the center, said element being non-removable from said retaining member without destructive effect.

2. In an anti-friction bearing adapted for attachment to the under side of a body bolster or the like, the combination with a retaining member having depending side walls and a top wall extending from end to end, said top wall having an opening therethrough and downwardly facing shoulders on the bottom side thereof, an upper bearing plate larger than the top of said opening for closing said opening and engaging the downwardly facing shoulders, thereby preventing upward displacement of said plate; of a plurality of anti-friction elements mounted between and guided by said side walls, said elements being insertable and removable only through said opening, said elements being arranged to roll back and forth and with their peripheries in engagement with said bearing plate, portions of said elements normally depending below said side walls and adapted to cooperate with an opposed bearing surface; and co-operating means on said side walls and elements by which the latter are supported and adapted to be returned to normal position under the influence of gravity, said means including, extensions from the ends of each element and guideways therefor on said side walls, said guideways being higher at their ends than at the center, said elements being non-removable from said retaining member without destructive effort.

3. In an anti-friction bearing adapted for attachment to the under side of a body bolster or the like, the combination with a retaining member having depending side walls and a top wall extending from end to end, said top wall having an opening provided therein; of a roller mounted between and guided by said side walls, said roller being insertable through said opening in the top wall and non-removable otherwise from between said side walls; an upper bearing plate on the interior of said retaining member, the latter having downwardly facing shoulders cooperable with said plate to prevent withdrawal thereof when in operative position; and a filler block occupying said opening in the top wall having its upper surface flush with the upper surface of the top wall, said block and plate being rigidly united.

4. In an anti-friction bearing of the character described adapted for attachment to the under side of a body bolster or the like, the combination with a retaining member having depending side walls and a top wall, said side walls being provided on the inner sides thereof with corresponding supporting guideways having their ends upwardly extended above the central portions thereof, said top wall being provided with an opening therethrough and with downwardly facing shoulders on the bottom side thereof; of a plurality of rollers each having centrally disposed studs at the ends thereof operating in said guideways and normally supported by said side walls, said rollers being insertable and removable only through said opening in the top wall; a wear plate on the under side of said top wall and engageable with said shoulders; and a filler block occupying said opening in the top wall, said block being rigidly united to said plate to thereby prevent removal of either the block, plate or rollers.

5. In a body bolster side bearing, the combination with a retaining member having a horizontal top wall and depending side walls, said top wall having a central opening therein and the side walls provided on their inner faces with opposed guideways, each guideway providing an inturned lower supporting flange, the flanges being upwardly curved at their ends; of a pair of anti-friction rollers, each of said rollers having integral studs at the ends thereof, said rollers being insertable and removable only through said opening, and, in normal position, sustained by said studs on said guide-supporting flanges; a wear plate insert disposed within said retaining member and located on the under side of said top wall, said plate insert being non-removable from the retaining member through said opening when the plate is in operative position; and a filler block occupying said opening in the top wall, said filler block being rigidly secured to the wear plate insert and forming a backing for the latter between it and the under side of the body bolster.

In witness that I claim the foregoing I have hereunto subscribed my name this 22nd day of Mch., 1921.

JOHN F. O'CONNOR.

Witnesses:
CARRIE GAILING,
UNA C. PERIN.